Nov. 29, 1960    J. S. OLES    2,961,894
VIBRATION DAMPER
Filed June 23, 1958
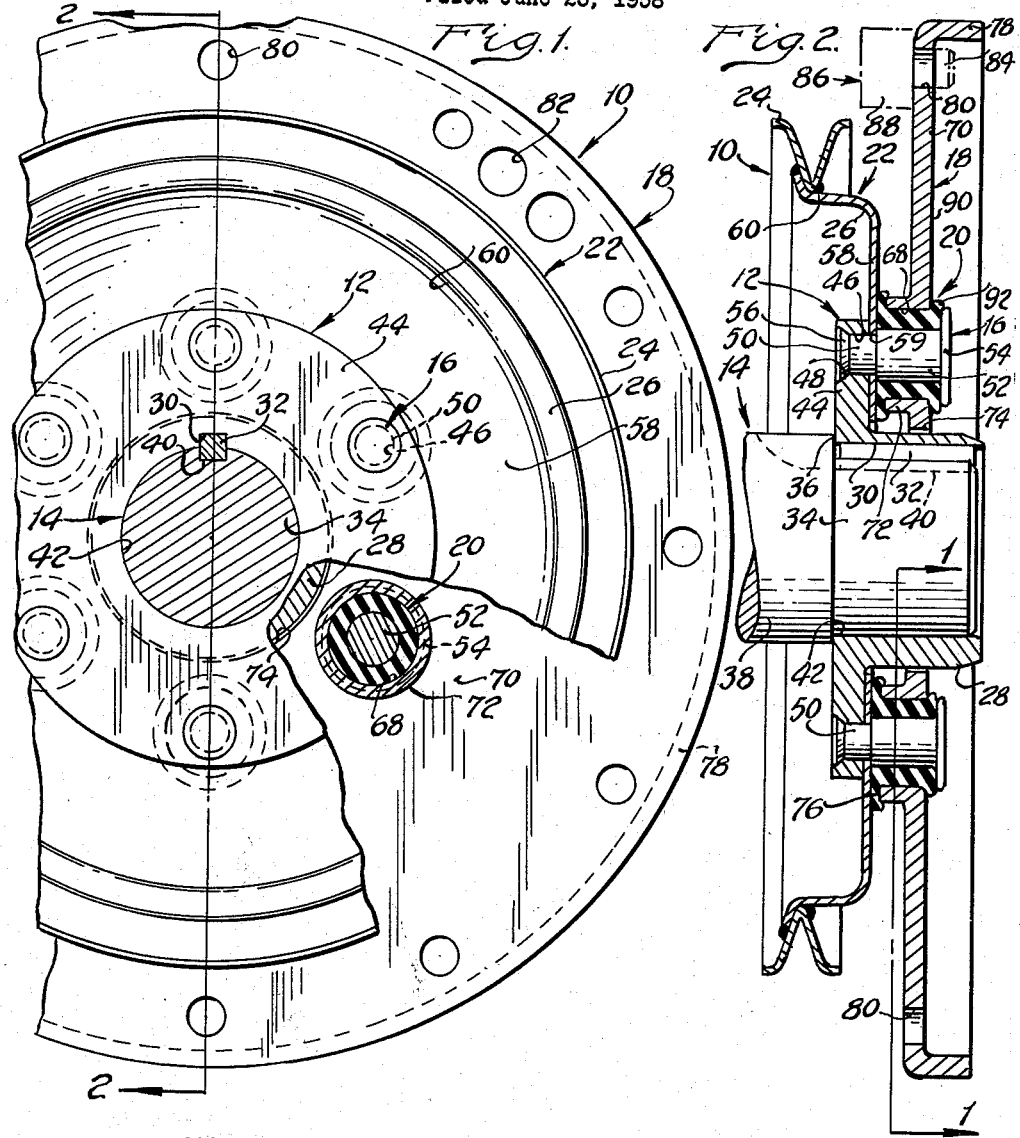
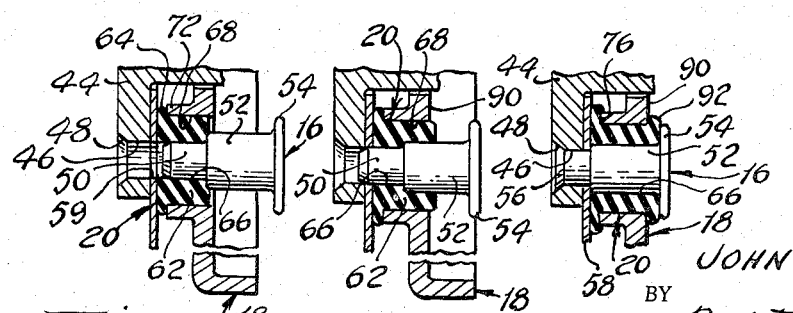
INVENTOR.
JOHN S. OLES
BY Barthel+Bugbee
ATTY'S.

United States Patent Office 2,961,894
Patented Nov. 29, 1960

2,961,894
VIBRATION DAMPER

John S. Oles, 15035 Prevost St., Detroit 27, Mich.

Filed June 23, 1958, Ser. No. 743,719

9 Claims. (Cl. 74—574)

This invention relates to vibration dampers for internal combustion engines and the like.

One object of this invention is to provide a vibration damper wherein an inertia member in the form of an inertia flywheel or disc is yieldingly supported upon a central hub mounted on the shaft transmitting the vibrations to be damped, the yielding connection between the inertia flywheel and the hub being made through bushings of elastic deformable material which are in a state of predominantly radial compression between the flywheel and the supporting pins mounted on the hub, thereby obtaining a superior vibration damping action in comparison with prior vibration dampers employing resilient bushings predominantly in a state of axial compression, which also tends to expel the supporting pin if the pin becomes weakened or disconnected at its end which engages the hub.

Another object is to provide a vibration damper, as set forth in the previous object, wherein the damping action is accomplished by means of a single supporting pin and a single full-length resilient bushing at each point of interconnection between the inertia flywheel and the hub, in contrast to the two half-length bushings inserted from opposite directions under predominantly axial compression in prior vibration dampers, thereby simplifying assembly, reducing cost of production and enabling a single element to do the work previously requiring two separate elements at each such point of interconnection.

Another object is to provide a vibration damper of the foregoing character wherein the entire damper unit is mounted by its hub on the vibration-transmitting shaft to be damped, without the need for dependence upon the additional bearings required in certain prior vibration dampers.

Another object is to provide a vibration damper of the foregoing character, the hub of which is capable of carrying one or more drive pulleys or sheaves which are completely segregated from the inertia flywheel so that its action or that of the devices driven by it have little or no effect upon the vibration damping operation of the inertia flywheel and its resilient supporting bushings.

Another object is to provide a vibration damper wherein each resilient supporting bushing for the inertia flywheel is confined between its supporting pin and a tubular flange upon the inertia flywheel in a radially-compressed condition by the use of a supporting pin having a diameter larger than the initial internal diameter of the bushing, thereby controlling the action of the portion of the bushing therebetween.

Another object is to provide a vibration damper as set forth in the object immediately preceding wherein the tubular flange has an enlargement or annular flange or head at its inner end and is shorter than the portion of the supporting pin within the bushing, thereby forcing the excess material in the resilient bushing outward at the outer end of the bushing between the inertia flywheel and the head of the supporting pin, thus locking the inertia flywheel between the bulges or enlargements at the opposite ends of each resilient bushing while resiliently insulating the inertia flywheel flanges from their respective supporting pins and adjacent hub, pulley or other nearby structure.

Another object is to provide a tuned vibration damper of the foregoing character wherein the tuning depends on the resilience of the supporting bushings or elastic deformable material and wherein the tuning can be controlled by changing the hardness of the elastic deformable material of which each bushing is composed.

Another object is to provide a method of making a vibration damper of the foregoing character wherein during assembly oversized supporting pins are forcibly inserted into resilient bushings of elastic deformable material with undersized bores, the bushings being confined radially in surrounding bores in such a manner as to confine the bushing between the pin and the bore and thereby cause excess material of the bushing to be protruded at one end of the confining bore and thereby create an annular segregating or insulating portion of the bushing separating it from its associated hub or other adjoining parts.

Other objects and advantages of the invention will become apparent during the course of the following description of the accompanying drawing, wherein:

Figure 1 is a front elevation of a tuned vibration damper according to one form of the invention, with a portion thereof in section along the line 1—1 in Figure 2 and with another portion broken away to conserve space and present the construction upon the largest possible scale;

Figure 2 is a central vertical section taken along the line 2—2 in Figure 1; and Figures 3, 4 and 5 are views showing successive steps in the insertion of an oversized supporting pin into an undersized resilient bushing so as to place the bushing in a state of predominantly radial compression with resulting protrusion of excess bushing material at one end thereof.

Referring to the drawing in detail, Figures 1 and 2 show a tuned vibration damper, generally designated 10, as consisting generally of a radially-flanged hub 12 keyed or otherwise drivingly secured to an engine or other shaft 14, the vibrations of which are to be damped, a multiplicity of supporting pins 16 carried by the hub 12, an inertia flywheel 18 resiliently and movably supported upon resilient bushings 20 of elastic deformable material, such as rubber or synthetic rubber, disposed between it and the pins 16, and a pulley 22 optionally carried by the hub 12 and pins 16 for driving other equipment (not shown) associated with the engine, such as a fan, power steering pump or the like. The pulley 22 is optional, may have single or multiple sheaves 24 mounted on its pulley hub 26, and its details are conventional and beyond the scope of the present invention.

The hub 12 of the vibration damper 10 consists of a sleeve-like axial portion 28 (Figure 2) having a keyway 30 by which it is drivingly connected by a key 32 to the reduced diameter portion 34 of the shaft 14, and seated against the annular shoulder 36 between the reduced diameter portion 34 and the enlarged or normal diameter portion 38 of the shaft 14. The reduced diameter portion 34 has the usual keyway 40 in which the key 32 is seated, the bore 42 of the hub 12 receiving the reduced diameter portion 34 of the shaft 14. At its inner end adjacent the annular shoulder 36, the hub 12 is provided with a radial flange portion 44 which near its periphery is provided with circumferentially-spaced bores 46 disposed with their axes parallel to the axis of the hub central bore 42 and having flared portions 48 at their inner ends.

Seated in the bores 46 are the reduced diameter inner end portions 50 of the supporting pins 16 which have enlarged diameter body portions 52 terminating in still further enlarged heads 54. As explained below in connection with the description of the method of making or assembling the vibration damper 10, the inner ends 56 of the pins 16 are upset, rivet-like, when assembly has been completed so as to cause them to expand into the flared entrances 48 to the hub bores 46. If the pulley 22 is provided, the central or radial pulley web portion 58 of its hub 26 is provided with circularly-spaced holes 59 aligned with the damper hub bores 46 and assembled against the damper hub flange 44 and held thereon by the supporting pins 16, the sheave 24 having been previously mounted on the rim portion 60 of the pulley hub 26 and staked, welded or otherwise secured thereto in a manner beyond the scope of the present invention. If, however, the pulley 22 is not provided, then the radially-flanged portion 44 of the hub 12 is preferably extended radially outward to form an abutment for the resilient bushings 20 presently provided by the radial portion 58 of the pulley hub 26.

The resilient bushings 20 in their initial or relaxed condition have cylindrical body portions 62 and inner end flanges 64 (Figure 3), the axial length, from its front back to the flange 64, of the body portion 62 being less than the axial length of the enlarged diameter body portion 52 of the supporting pins 16. The body portion 62 of each resilient bushing 20 has an axial bore 66 which is of considerably smaller diameter than the outside diameter of the body portion 52 of the supporting pins 16 and of approximately the same diameter or slightly larger than the outside diameter of the reduced diameter inner end portions 50 of the supporting pins 16 (Figure 3).

The resilient bushings 20 are mounted in bores 68 partly within the radial web portions 70 of the inertia flywheel 18 and partly within axially-extending tubular flanges 72 spaced circumferentially apart from one another with their axes on the same diameter of circle or cylinder as the axes of the hub bores 46 (Figure 2). From Figures 2 to 5 inclusive it will be seen that the heads 54 of the inertia flywheel supporting pins 16 are slightly larger in diameter than the diameters of the inertia flywheel bores 68 through which their body portions 52 pass. This construction retains the inertia flywheel 18 in assembly with the hub 12 in the event of disintegration of the resilient bushings 20 until repairs can be effected. The web 70 of the inertia flywheel 18 has a central opening 74 which is of somewhat larger diameter than the external diameter of the axial portion 28 of the vibration damper hub 12 so as to permit a sufficiently large clearance therebetween during oscillation of the inertia flywheel 18 in the operation of the invention. The axial length of each flange 72 and axial thickness of the web 70, namely the total length of each bore 68, is less than the axial length of the enlarged diameter or body portion 52 of the supporting pin 16 with which it coacts (Figures 2 and 5) so as to provide for a space between the pin head 54 and the web 70 on the one hand, and the flange end 76 and the pulley web 58 on the other hand to provide for expansion and protrusion of the bushing 20 during assembly, as well as to accommodate the bushing head or flange 64.

The inertia flywheel 18 is provided with an axially-directed rim or periphery 78 (Figure 2) in the form of a cylindrical flange. Near the peripheral rim 78, the web 70 is provided with multiple holes 80 drilled at intervals in the peripheral zone of the web 70 and also with slightly larger balance holes 82, the number and location of which are determined by the particular model of engine being balanced. The holes 80 are adapted to receive the reduced diameter shanks 84 of plugs 86 having enlarged heads 88, the shanks 84 being press-fitted or otherwise securely inserted in their respective holes 80.

In the method of assembly of the vibration damper 10, the pulley 22, if one is used, is assembled against the vibration damper hub flange 44 with its holes 59 aligned with the corresponding circumferentially-spaced bores 46 of the flange 44. Meanwhile, the bushings 20 have been inserted in their respective bores 68 in the tubular flanges 72 of the inertia flywheel 18 with their flanges 64 abutting the ends of the flanges 72 (Figure 3). For convenience it is contemplated that a set of the resilient bushings 20 may be interconnected by an annular ring (not shown) so as to align them by molding them simultaneously with the connecting ring. This ring has been omitted in order to simplify the drawing, as it performs no important functional action after assembly has been completed.

The inertia flywheel 18 with its resilient bushings 20 of elastic deformable material thus mounted in its tubular flange bore 68 is then placed against the already aligned pulley 22 and hub flange 44 with the bores 66 of the bushings 20 aligned with the bores 46 and 59 respectively in a suitable fixture (not shown). The reduced diameter portions 50 of the supporting pins 16 are then inserted in the bushing bores 66 (Figure 3) after which axial pressure is applied against the heads 54 of the pins 16 to force the enlarged or body portions 52 thereof into the smaller diameter bores of the bushings 20 (Figure 4). This action starts a radial compression of the body portion 62 of each bushing 20 between the enlarged body portion 52 of the pin 16 and the wall of the bore 68 of the inertia flywheel 18. Since the elastic deformable material of each bushing 20 is thus entrapped, its length increases, as shown by the contrast between Figures 3 and 4, until as the enlarged portion 52 of the pin 16 fully occupies the bore 66 of the bushing 20 (Figure 5), the surplus elastic deformable material, having no other place to go, protrudes beyond the outer surface 90 of the web 70 and is pushed radially outward between the web surface 90 and the pin head 54 to form an annular enlargement 92 (Figures 2 and 5). This provision of the bushing flange 64 and enlargement 92 with the inertia flywheel 18 mounted therebetween effectively insulates and segregates the inertia flywheel 18 from all adjacent metallic structure, such as the head 54 of each pin 16 and the pulley web 58, if used, or the vibration damper hub flange 44 in the absence of the pulley. When assembly is complete, as shown in Figure 5, the end portion 56 of each pin 16 is upset in a rivet-like operation so as to enlarge and expand it into the flared entrance 48 of each hub bore 46.

In the operation of the invention, let it be assumed that the plugs 86, if used, have been inserted in their respective peripheral holes 80 and that the balance holes 82 have been drilled to properly balance the inertia flywheel 18 upon its bushings 20, supporting pins 16 and hub 12. Let it also be assumed that the vibration damper 10 has been mounted on and keyed or otherwise drivingly secured to the engine shaft 14, the engine mechanism of which produces the vibrations which are to be damped. As the shaft 14 rotates during operation of the engine, the vibrations therein produced are imparted through the damper hub 12 to the bushings 20 by way of the supporting pins 16 and thence with a delayed action effect due to the yielding of the resilient bushings 20 to the inertia flywheel, causing it to oscillate as it is rotated so as to balance out the vibrations imparted to it by the engine shaft 14.

While for convenience it has been described above that during the process of assembling the vibration damper the resilient bushings 20 of elastic deformable material, such as rubber or synthetic rubber or the like, are inserted in the flywheel bores 68 from the rear of the inertia flywheel 18 with their flanges 64 against the rearward ends of the vibration damper bore flanges or bosses 72, it will be evident that the positions of these bushings 20 may be reversed relatively to the inertia flywheel 18. In other words, the bushings 20 may be inserted in the front ends of the bores 68 until their flanges 64 abut the front surface 90 of the inertia flywheel 18, after which the insertion of the pin 16 and expansion of the bushings 20 is carried out in the manner described above.

The hardness of the elastic deformable material of which the bushings 20 are made is chosen so as to be sufficiently hard to resist pinching between the bushing 20 and its respective pin 16. For this purpose, it is preferred that the rubber or other material for the bushings 20 shall be of a hardness in excess of 60 in the standard durometer test, in order to avoid excessive softness and improper working.

While the mechanism for assembling the various parts of the vibration damper 10 of the present invention has not been illustrated in the drawings, a specific mode of assembling on a mass production basis may be as follows: The pulley 22, if used, and the hub 12 are placed with their holes 59 and 46 respectively in alignment with one another upon a fixture supported on stiff cushion springs of, for example, 1000 pounds resistance to yielding, and in further alignment with an equal number of heading tools supported in a suitable base upon the bed of a press. Having inserted the rubber bushings 20 in their respective bores 68 in the inertia flywheel 18, the operator then places the flywheel upon the pulley and the hub with the bushing bores 66 in alignment with the already aligned holes 59 and 46 of the pulley 22 and hub 12 respectively. He then inserts the pins 16 with their reduced diameter portions 50 in the forward ends of the bores 66 of the bushings 20 (Figure 3) and then starts the press in operation so that its platen descends. The descending platen first forces the enlarged portions 52 of the pins 16 into the bushing bores 66 (Figure 4), thereby expanding the bushings 20 radially and finally forcing the rubber thereof to protrude in an annular flange-like projection 92 between the front face 90 of the inertia flywheel 18 and the head 54 of the pin 16, by the use of a pressing force which is insufficient to materially compress the cushion springs of the fixture, such as, for example, a force of about 600 pounds. He then continues to operate the press and to cause its platen to descend with increased force until the ends of the reduced diameter end portions are forced through the holes 46 in the hub 12 into engagement with the heading tools to upset and enlarge the ends of the pins in a single continuous pressing operation. This action firmly and permanently secures the various parts of the vibration damper 10 together.

What I claim is:

1. A vibration damper for an internal combustion engine shaft comprising a central hub adapted to be rotatably connected to said shaft, a plurality of shouldered inertia flywheel supporting elements mounted in circumferentially-spaced relationship upon said hub with their axes disposed parallel to the axis of rotation of said hub, bushings of resilient material mounted on said elements, each bushing having a flange on one end thereof and a centrally-apertured substantially circular inertia flywheel yieldingly mounted upon said bushings in radially-spaced relationship to said hub, said flywheel having therein a plurality of bores spaced apart from one another in a circular path and disposed coaxial with said supporting elements and receiving said bushings and elements, the walls of said bores cooperating with said supporting elements to maintain said bushings in a state of predominantly radial compression therebetween, said inertia flywheel supporting elements having heads thereon with diameters exceeding the diameters of said bores, whereby to retain said inertia flywheel in assembly with said hub in the event of disintegration of said bushings.

2. A vibration damper for an internal combustion engine shaft comprising a central hub adapted to be rotatably connected to said shaft, a plurality of shouldered inertia flywheel supporting elements mounted in circumferentially-spaced relationship upon said hub with their axes disposed parallel to the axis of rotation of said hub, bushings of resilient material mounted on said elements, each bushing having a flange on one end thereof, and a centrally-apertured substantially circular inertia flywheel yieldingly mounted upon said bushings in radially-spaced relationship to said hub, said flywheel having therein a plurality of bores spaced apart from one another in a circular path and disposed coaxial with said supporting elements and receiving said bushings, the walls of said bores cooperating with said supporting elements to maintain said bushings in a state of predominantly radial compression therebetween, the opposite ends of said bushings projecting radially outward from said supporting elements on opposite sides of said inertia flywheel.

3. A vibration damper for an internal combustion engine shaft comprising a central hub adapted to be rotatably connected to said shaft, a plurality of shouldered inertia flywheel supporting elements mounted in circumferentially-spaced relationship upon said hub with their axes disposed parallel to the axis of rotation of said hub, bushings of resilient material mounted on said elements, each bushing having a flange on one end thereof, and a centrally-apertured substantially circular inertia flywheel yieldingly mounted upon said bushings in radially-spaced relationship to said hub, said flywheel having therein a plurality of bores spaced apart from one another in a circular path and disposed coaxial with said supporting elements and receiving said bushings, the walls of said bores cooperating with said supporting elements to maintain said bushings in a state of predominantly radial compression therebetween, the lengths of said bores being less than the lengths of the portions of said supporting elements within said bushings, and the opposite ends of said bushings projecting axially beyond the opposite ends of said bores.

4. A vibration damper for an internal combustion engine shaft comprising a central hub adapted to be rotatably connected to said shaft, a plurality of shouldered inertia flywheel supporting elements mounted in circumferentially-spaced relationship upon said hub with their axes disposed parallel to the axis of rotation of said hub, bushings of resilient material mounted on said elements, each bushing having a flange on one end thereof, and a centrally-apertured substantially circular inertia flywheel yieldingly mounted upon said bushings in radially-spaced relationship to said hub, said flywheel having therein a plurality of bores spaced apart from one another in a circular path and disposed coaxial with said supporting elements and receiving said bushings, the walls of said bores cooperating with said supporting elements to maintain said bushings in a state of predominantly radial compression therebetween, the lengths of said bores being less than the lengths of the portions of said supporting elements within said housing, said supporting elements having outer end enlargements thereon abuttingly engaging the outer ends of said bushings, the opposite ends of said bushings projecting axially beyond the opposite ends of said bores into engagement with said hub and said end enlargements respectively.

5. A vibration damper for an internal combustion engine shaft comprising a central hub adapted to be rotatably connected to said shaft, a plurality of shouldered inertia flywheel supporting elements mounted in circumferentially-spaced relationship upon said hub with their axes disposed parallel to the axis of rotation of said hub, bushings of resilient material mounted on said elements, each bushing having a flange on one end thereof, and a centrally-apertured substantially circular inertia flywheel yieldingly mounted upon said bushings in radially-spaced relationship to said hub, said flywheel having therein a plurality of bores spaced apart from one another in a circular path and disposed coaxial with said supporting elements and receiving said bushings, the walls of said bores cooperating with said supporting elements to maintain said bushings in a state of predominantly radial compression therebetween, each supporting element carrying a single bushing of length exceeding the axial length of its respective bore.

6. A vibration damper, according to claim 3, wherein the axially-projecting ends of said bushings also project radially adjacent the opposite ends of said bores.

7. A vibration damper, according to claim 4, wherein the axially-projecting ends of said bushings also project radially adjacent the opposite ends of said bores.

8. A process of resiliently mounting a multiple-bored inertia flywheel upon an alignedly-bored hub in resiliently-insulated relationship therewith by means of multiple pins with enlarged heads thereon and resilient bushings flanged at one end, said pins having oversized shanks of considerably greater diameter than the bushing bores, said process comprising inserting the bushings in the flywheel bores until their flanges abut one side of the flywheel, forcing the pins axially through the bushings into the hub bores and simultaneously causing the oversized shanks of the pins in the bushing bores to radially expand the bushings into tight contact with the flywheel bore walls, and securing the ends of the pins in the hub bores, each bushing being sufficiently undersized internally relatively to its respective pin that radially expanding each bushing also enlarges its free end portion so as to expand it radially between the head of the pin and the adjacent side of the flywheel whereby to form in effect an approximately annular cushion flange therebetween.

9. A process, according to claim 8, including further forcing the pins at the end of the said forcing step of the operation into end-enlarging engagement with pin-enlarging tool means disposed in alignment therewith.

References Cited in the file of this patent

UNITED STATES PATENTS

| | | |
|---|---|---|
| 1,739,270 | Thiry | Dec. 10, 1929 |
| 1,861,390 | Gunn | May 31, 1932 |
| 1,874,515 | Harris | Aug. 30, 1932 |
| 1,916,309 | Griswold | July 4, 1933 |
| 1,940,885 | Rosenberg | Dec. 26, 1933 |
| 2,379,508 | Dodge | July 3, 1945 |
| 2,450,701 | Wahlberg et al. | Oct. 5, 1948 |